US010959146B2

(12) United States Patent
Fujita

(10) Patent No.: US 10,959,146 B2
(45) Date of Patent: Mar. 23, 2021

(54) COMMUNICATION APPARATUS, EXTERNAL APPARATUS, CONTROL METHOD FOR COMMUNICATION APPARATUS, CONTROL METHOD FOR EXTERNAL APPARATUS, AND NON-TRANSITORY COMPUTER-READABLE STORAGE MEDIUM

(71) Applicant: CANON KABUSHIKI KAISHA, Tokyo (JP)

(72) Inventor: Shunji Fujita, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 90 days.

(21) Appl. No.: 16/022,826

(22) Filed: Jun. 29, 2018

(65) Prior Publication Data

US 2019/0014518 A1 Jan. 10, 2019

(30) Foreign Application Priority Data

Jul. 4, 2017 (JP) ............................ JP2017-131490

(51) Int. Cl.
*H04W 36/14* (2009.01)
*H04W 76/15* (2018.01)
(Continued)

(52) U.S. Cl.
CPC ........... *H04W 36/14* (2013.01); *H04W 48/16* (2013.01); *H04W 76/15* (2018.02); *H04W 76/30* (2018.02);
(Continued)

(58) Field of Classification Search
CPC ..... H04W 36/14; H04W 76/16; H04W 76/30; H04W 48/16; H04W 76/15; H04W 48/20; H04W 84/12; H04W 48/08
See application file for complete search history.

(56) References Cited

U.S. PATENT DOCUMENTS

2008/0304454 A1* 12/2008 Zhong ............... H04W 36/0011 370/331
2009/0265458 A1* 10/2009 Baker ..................... H04L 47/10 709/224

(Continued)

FOREIGN PATENT DOCUMENTS

CN 1881919 A 12/2006
CN 104956761 A 9/2015

(Continued)

OTHER PUBLICATIONS

Shintaro Kawamura et.al., The automatic setup of area-restricted adhoc wireless network, FIT2015 14th Forum on Information Technology Lecture Collection, 4th Peer-Reviewed Paper, Aug. 24, 2015, pp. 193-194.

(Continued)

*Primary Examiner* — Walter J Divito
*Assistant Examiner* — Anthony Luo
(74) *Attorney, Agent, or Firm* — Cowan, Liebowitz & Latman, P.C.

(57) ABSTRACT

A communication apparatus comprising, a first communication unit performing first-type communication, a second communication unit performing second-type communication different, and a control unit controlling the first and second communication units, wherein the control unit establishes a connection through the first-type communication and a connection through second-type communication, to each external apparatus, and communicates with each external apparatus, controls the first communication unit to send a notification indicating the presence of the communication apparatus itself, controls the first communication unit to establish a connection through the first-type communication to a first one of external apparatuses that responds to the notification, controls the second communication unit to establish a connection through the second-type communi- (Continued)

cation to the first external apparatus, on the basis of the first-type communication with the first external apparatus.

18 Claims, 10 Drawing Sheets

(51) Int. Cl.

| | |
|---|---|
| ***H04W 76/30*** | (2018.01) |
| ***H04W 48/16*** | (2009.01) |
| ***H04W 48/20*** | (2009.01) |
| ***H04W 84/12*** | (2009.01) |
| ***H04W 4/80*** | (2018.01) |

(52) U.S. Cl.
CPC .............. *H04W 4/80* (2018.02); *H04W 48/20* (2013.01); *H04W 84/12* (2013.01)

(56) References Cited

U.S. PATENT DOCUMENTS

| | | | | | |
|---|---|---|---|---|---|
| 2011/0205969 | A1* | 8/2011 | Ahmad | H04W 16/28 | 370/328 |
| 2013/0029595 | A1* | 1/2013 | Widmer | H04B 5/0031 | 455/39 |
| 2014/0323048 | A1* | 10/2014 | Kang | H04W 4/80 | 455/41.2 |
| 2016/0066181 | A1* | 3/2016 | Henry | H04L 63/0807 | 726/5 |
| 2017/0332301 | A1* | 11/2017 | Horn | H04W 36/14 | |

FOREIGN PATENT DOCUMENTS

| | | | |
|---|---|---|---|
| CN | 105163371 | A | 12/2015 |
| CN | 106647665 | A | 5/2017 |
| CN | 106850723 | A | 6/2017 |
| JP | 2011-151746 | A | 8/2011 |
| KR | 10-2014-0128039 | A | 11/2014 |
| KR | 10-2015-0121186 | A | 10/2015 |
| KR | 10-2016-0054552 | A | 5/2016 |
| WO | 2016/095584 | A1 | 6/2016 |

OTHER PUBLICATIONS

The above references were cited in a Sep. 30, 2019 Japanese Office Action, that issued in Japanese Patent Application No. 2017-131490.

The above documents were cited in a Oct. 10, 2020 Chinese Office Action, that issued in Chinese Patent Application No. 201810722410.5.

The above foreign patent documents were cited in the Dec. 4, 2020 Korean Office Action, which is unclosed with an English Translation, that issued in Korean Patent Application No. 10-2018-0076816.

* cited by examiner

COMMUNICATION APPARATUS, EXTERNAL APPARATUS, CONTROL METHOD FOR COMMUNICATION APPARATUS, CONTROL METHOD FOR EXTERNAL APPARATUS, AND NON-TRANSITORY COMPUTER-READABLE STORAGE MEDIUM

BACKGROUND OF THE INVENTION

Field of the Invention

The invention relates to communication apparatuses, external apparatuses, control methods for communication apparatuses, control methods for external apparatuses, and a non-transitory computer-readable storage medium.

Description of the Related Art

A mechanism called "handover" has in recent years been proposed as a technique for establishing a connection through wireless LAN communication using a simple operation. Handover is a mechanism for switching to a communication technology having a large communication bandwidth, such as wireless LAN, using a communication technology having low power consumption, such as Bluetooth (registered trademark) Low Energy (hereinafter referred to as BLE) communication technology.

Japanese Patent Laid-Open No. 2011-151746 proposes a mechanism in which, upon receiving a handover switching request, it is determined whether or not a requested communication technology can be used, and if the determination result is negative, a state in which the requested communication technology can be used is established so as to switch to the communication technology.

In BLE communication technology, a network is constructed by devices that provide a service (called "peripherals") and devices that use a service (called "centrals"). These devices are connected together in a star topology. There is a constraint that while a plurality of peripherals can be connected to a single central, a plurality of centrals cannot simultaneously be connected to a single peripheral.

It would be construed that the above handover mechanism may be used to establish a wireless LAN communication connection between a single peripheral and a plurality of centrals. However, BLE communication technology is for star-connected topologies, and therefore, a single peripheral cannot simultaneously perform BLE communication with a plurality of centrals, and therefore, cannot simultaneously perform a handover process.

SUMMARY OF THE INVENTION

The invention provides a technique of establishing a wireless LAN communication connection between a peripheral and a plurality of centrals using a handover mechanism.

One aspect of embodiments of an invention relates to a communication apparatus comprising, a first communication unit configured to perform first-type communication, a second communication unit configured to perform second-type communication different from the first-type communication, and a control unit configured to control the first and second communication units, wherein the control unit establishes a connection through the first-type communication and a connection through second-type communication, to each of a plurality of external apparatuses, and communicates with each of the plurality of external apparatuses, controls the first communication unit to send a notification indicating the presence of the communication apparatus itself, controls the first communication unit to establish a connection through the first-type communication to a first one of the plurality of external apparatuses that responds to the notification, controls the second communication unit to establish a connection through the second-type communication to the first external apparatus, on the basis of the first-type communication with the first external apparatus, and if the connection through the second-type communication is established, controls the first communication unit to terminate the connection through the first-type communication to the first external apparatus and controls the first communication unit to resume sending the notification.

Further features of the invention will become apparent from the following description of exemplary embodiments with reference to the attached drawings.

DESCRIPTION OF THE EMBODIMENTS

Embodiments of the invention will now be described in detail with reference to the accompanying drawings.

First Embodiment

<System Configuration>

Figure 1A:
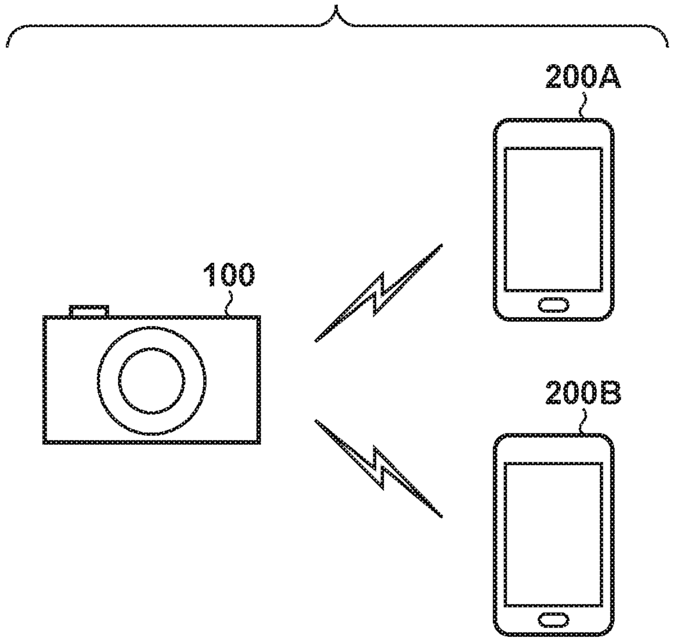
FIG. 1A is a diagram showing a system configuration according to an embodiment of the invention.

FIG. 1A is a diagram showing a system configuration in this embodiment. An illustrative system according to this embodiment includes a communication apparatus 100, and external apparatuses 200A and 200B (the external apparatuses 200A and 200B are also hereinafter collectively referred to as "the external apparatuses 200"). The communication apparatus 100 is a digital camera, or the like, that can operate as a peripheral, and the external apparatuses 200 are a smartphone, or the like, that can operate as a central. The communication apparatus 100 and the external apparatuses 200 can communicate with each other by BLE communication technology. The communication apparatus 100 can operate as a BLE peripheral, and the external apparatuses 200 can operate as a BLE central.

The communication apparatus 100 cannot simultaneously establish a BLE communication connection with both of the external apparatuses 200A and 200B. Meanwhile, the communication apparatus 100 and the external apparatuses 200 can also communicate with each other by wireless LAN communication technology. The communication apparatus 100 operates as an access point (hereinafter referred to as an "AP") of wireless LAN to generate a wireless LAN network. The external apparatuses 200 operate as a wireless LAN station (hereinafter referred to as an "STA"), and when connected to a wireless LAN network generated by the communication apparatus 100, communicate with the communication apparatus 100 by wireless LAN communication technology. Wireless LAN communication technology employs a connected topology different from that of BLE communication technology. That is, the communication apparatus 100 can simultaneously communicate with all STA apparatuses connected to the wireless LAN network by wireless LAN communication technology. Although FIG. 1A shows an example in which there are two external apparatuses 200, the number of external apparatuses 200 operating as an STA is not limited to two, in this embodiment, the system can include a predetermined number of external apparatuses that can be accommodated in a wireless LAN network generated by the communication apparatus 100.

The communication apparatus 100 and the external apparatuses 200, when a wireless LAN communication connection has not been established therebetween, can perform a handover process of establishing a wireless LAN communication connection, using BLE communication technology. A wireless LAN communication connection is established by sending a request to start a handover process, and exchanging a parameter for a wireless LAN communication connection, using BLE communication technology. Note that the handover process is an example of a connection switching process of this embodiment.

<Internal Configuration of Apparatuses>

Figure 1B:
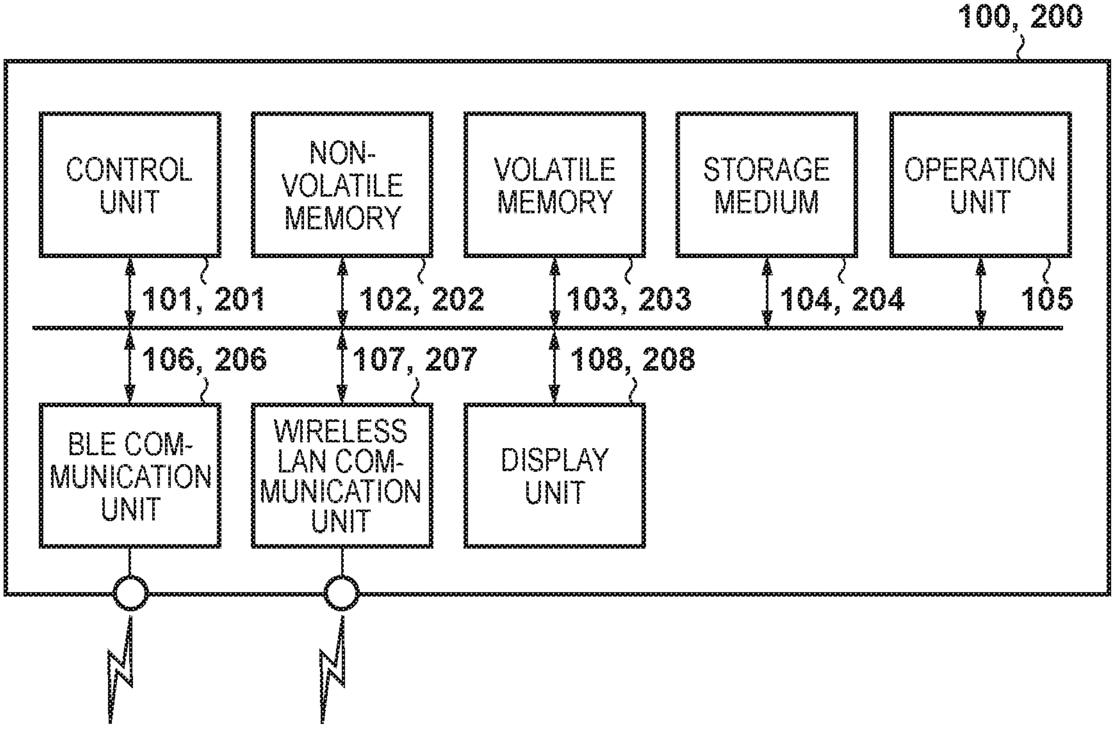
FIG. 1B is a diagram showing an example of a hardware configuration of an apparatus according to an embodiment of the invention.

A hardware configuration of the communication apparatus 100 and the external apparatuses 200 included in the system of this embodiment will be described with reference to FIG. 1B, FIG. 1B is a diagram showing an example hardware configuration of the communication apparatus 100 and the external apparatuses 200 in this embodiment. In this embodiment, for the sake of simplicity, it is assumed that the communication apparatus 100 and the external apparatuses 200 have the same hardware configuration. Reference numbers between 100 and 199 indicate elements of the communication apparatus 100, and reference numbers between 200 and 299 indicate elements of the external apparatuses 200.

The communication apparatus 100 is an apparatus, such as a digital camera, a printer, a smartwatch, or headphones, that can operate as a peripheral. In the communication apparatus 100, a control unit 101 can execute a control program stored in a non-volatile memory 102 to control all process blocks in the communication apparatus 100. The control unit 101 can be configured by one or more processors, such as a CPU or an MPU. The non-volatile memory 102 is a storage device storing a control program executed by the control unit 101.

A volatile memory 103 functions as a working memory that is used when the control unit 101 executes a control program. The volatile memory 103 is also used as an area for storing data that is sent or received by a BLE communication unit 106 and a wireless LAN communication unit 107. A storage medium 104 is used as an area for storing data that is transferred by the BLE communication unit 106 and the wireless LAN communication unit 107, and a parameter, or the like, that are involved in such transfer. The storage medium 104 may, for example, be a large-capacity flash memory, a memory card, an HDD, or the like. The storage medium 104 may be configured to be removably attached to the communication apparatus 100. An operation unit 105 receives a user's operation, and sends input information to the control unit 101. The operation unit 105 can be configured as a mode dial, a touch panel, a button switch, a directional pad, or the like.

The BLE communication unit 106 performs communication compliant with a Bluetooth Low Energy (BLE) standard. BLE communication is performed in a narrow transfer bandwidth and has low power consumption compared to wireless LAN communication. The BLE communication unit 106 may operate as a process unit that performs first-type wireless communication in this embodiment. The wireless LAN communication unit 107 performs communication using a wireless LAN communication technology compliant with the IEEE802.11 standard. The wireless LAN communication unit 107 may operate as a process unit that performs second-type wireless communication of the communication apparatus 100 in this embodiment. A display unit 108, which may, for example, be an LCD panel or an LED, has the function of outputting information that can be visually recognized.

The above description of the configuration of the communication apparatus 100 can be read as the description of the configuration of the external apparatuses 200 by replacing the communication apparatus 100 with the external apparatuses 200, and the control unit 101 through the display unit 108 with a control unit 201 through a display unit 208.

<Handover Process Sequence>

Figure 2A:
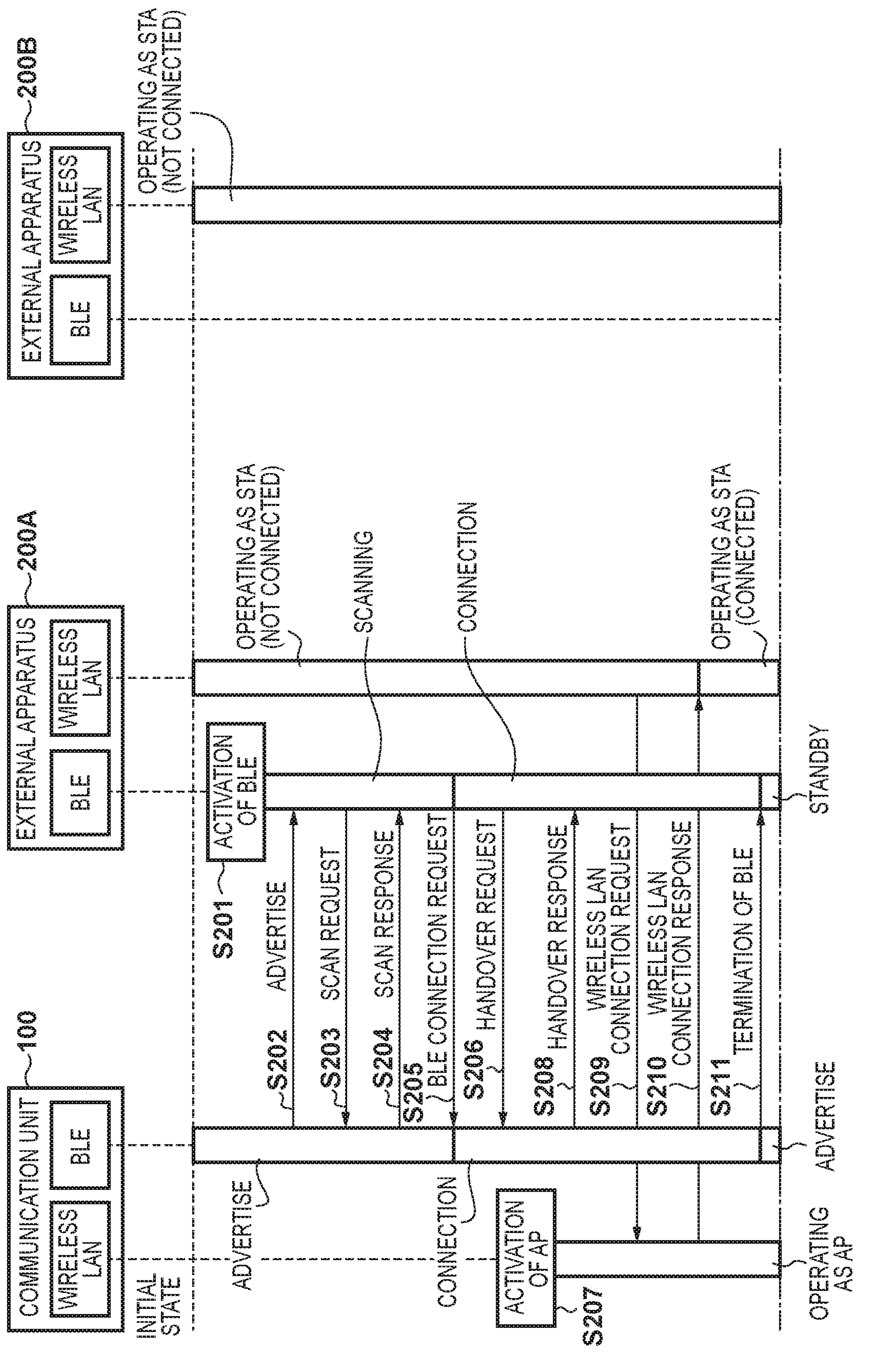
FIG. 2A and FIG. 2B are diagrams showing an example of a sequence of a process executed by a system according to a first embodiment of the invention.

Next, a handover process sequence in the system according to this embodiment will be described with reference to FIGS. 2A and 2B. This sequence is an example sequence of a handover process executed between the communication apparatus 100 and a plurality of external apparatuses (200A and 200B) to establish wireless LAN communication therebetween.

In the sequence, when the communication apparatus 100 is in its initial state, the BLE communication function of the communication apparatus 100 is operating in an advertise mode, and the wireless LAN communication function of the communication apparatus 100 is paused. As used herein, the advertise mode with respect to an apparatus refers to a state which is equivalent to the advertising state defined in the BLE communication standard, and in which the apparatus is sending an advertising channel packet for notifying its presence to other apparatuses. In the state in which the wireless LAN communication function is paused, power consumption for wireless LAN communication is reduced, and therefore, the power consumption of the communication apparatus 100 is low.

In the sequence, when the external apparatus 200A and 200B are in their initial states, the BLE communication functions of the external apparatuses 200A and 200B are paused, the wireless LAN communication functions of the external apparatus 200A and 200B are operating as an STA, and the external apparatus 200A and 200B are not connected to a wireless LAN network. Each step in the sequence will now be described.

In step S201, the external apparatus 200A activates the BLE function in a scanning mode. This may, for example, be executed by a user operating the external apparatus 200A.

For example, the scanning mode may be activated according to an operation of activating a specific application. The scanning mode refers to a state which is equivalent to the scanning state defined in the BLE communication standard, and in which the receipt of an advertising channel packet is awaited. At this time, a user's operation is not performed on the external apparatus 200B, and the external apparatus 200B is maintained in a state in which the BLE communication function is paused. As a result, a process for establishing a BLE communication connection is executed only between the communication apparatus 100 and the external apparatus 200A.

Figure 3:
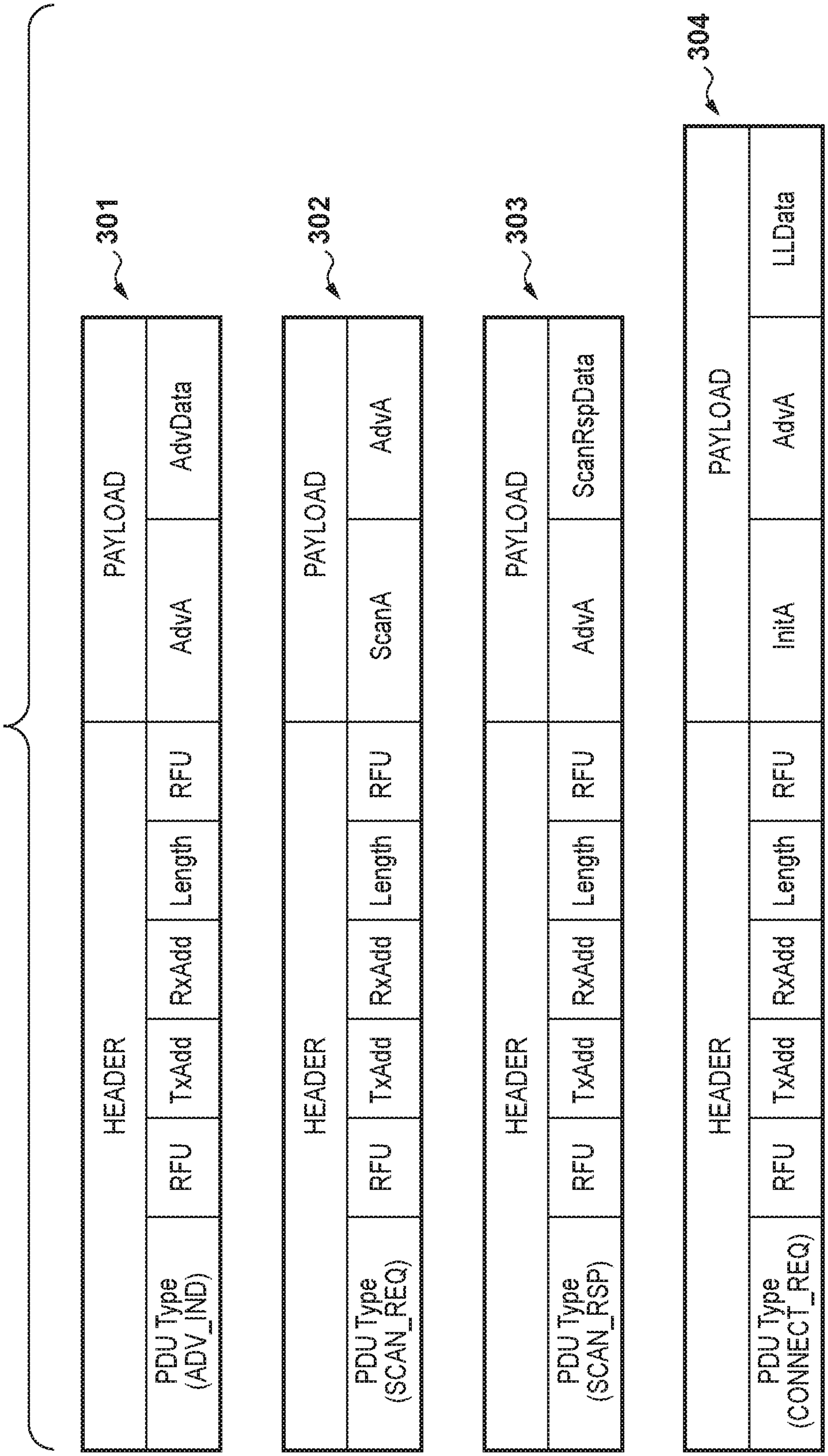
FIG. 3 is a diagram for describing a BLE communication packet format according to an embodiment of the invention.

In step S202, the communication apparatus 100 sends an advertise packet. The advertise packet refers to a packet that is sent to other apparatuses to notify those apparatuses of the presence of the communication apparatus 100, and is received by the external apparatus 2004 when the external apparatus 200A is operating in the scanning mode. FIG. 3 shows a format 301 of an advertise packet. The format 301 is the format of an ADVERTISING CHANNEL PDU packet whose PDU type is ADV_IND as defined in the BLE standard. As shown in FIG. 3, the ADVERTISING CHANNEL PDU includes a header and a payload. The payload of the ADV_IND packet includes AdvA and AdvData. AdvA is an area where the Bluetooth device (DB) address of an apparatus to which an ADV_IND packet is sent. In step S202, the BD address of the communication apparatus 100 is stored into AdvA. AdvData is an area where any suitable data can be contained. In this embodiment, AdvData is used to store information related to a wireless LAN network generated by the communication apparatus 100. A detailed description will be given below.

In step S203, the external apparatus 200A sends a BLE scan request packet to the communication apparatus 100, and the communication apparatus 100 receives the scan request packet. This packet can be sent in response to an advertise packet in order to request acquisition of detailed information of the communication apparatus 100. FIG. 3 shows a format 302 of the scan request packet. The format 302 is the format of an ADVERTISING CHANNEL PDU packet whose PDU type is SCAN_REQ as defined in the BLE standard. As shown in FIG. 3, the payload of the SCAN_REQ packet includes ScanA and AdvA. ScanA is the BD address of an apparatus that sends a scan request packet. In step S203, the BD address of the external apparatus 2004 is stored into ScanA. AdvA is similar to that of the ADV_IND packet. In step S203, the BD address of the communication apparatus 100 is stored into AdvA.

In step S204, the communication apparatus 100, which has received the scan request packet, sends a scan response packet to the external apparatus 200A in response to the scan request packet. The external apparatus 200A receives the scan response packet sent by the communication apparatus 100. FIG. 3 shows a format 303 of the scan response packet. The format 303 is the format of an ADVERTISING CHANNEL PDU packet whose PDU type is SCAN_RSP as defined in the BLE standard. As shown in FIG. 3, the payload of the SCAN_RSP packet includes AdvA and ScanRspData. AdvA is similar to that of the ADV_IND packet. In step S204, the BD address of the communication apparatus 100 is stored into AdvA. ScanRspData is an area where any suitable data can be stored. In this embodiment, ScanRspData is used to store information related to a wireless LAN network generated by the communication apparatus 100. A detailed description will be given below.

In step S205, the external apparatus 200A sends a BLE connection request packet to the communication apparatus 100, and the communication apparatus 100 receives the BLE connection request packet from the external apparatus 200A. This packet is used to request a BLE communication connection. FIG. 3 shows a format 304 of the BLE connection request packet. The format 304 is the format of an ADVERTISING CHANNEL PDU packet whose PDU type is CONNECT_REQ as defined in the BLE standard. As shown in FIG. 3, the payload of the CONNECT_REQ packet includes InitA, AdvA, and LLDAta. InitA is the BD address of an apparatus that sends a BLE connection request packet. In step S205, the BD address of the external apparatus 2004 is stored into InitA. AdvA is similar to that of the ADV_IND packet. In step S205, the BD address of the communication apparatus 100 is stored into AdvA. LLData is a parameter related to a BLE communication connection. In step S205, a BLE communication connection is established between the communication apparatus 100 and the external apparatus 200A, and the operation modes in BLE communication of both the communication apparatus 100 and the external apparatus 200A transition to a connection mode. The connection mode refers to a state equivalent to the Connection State defined in the BLE communication standard, in which communication compliant with the ATT protocol is performed using a DATA CHANNEL PDU packet.

After a BLE communication connection has been established, a handover process is started in response to that. Initially, in step S206, the external apparatus 200A uses the Request method of the ATT protocol to send a handover request to the communication apparatus 100, and the con apparatus 100 receives that handover request from the external apparatus 200A. The communication apparatus 100, upon receiving the handover request, activates the wireless LAN communication unit 107 to generate a wireless LAN network in step S207 if a wireless LAN network has not been generated. After step S207, the communication apparatus 100 operates as an AP. In step S207, the above low power consumption state of the communication apparatus 100 is ended.

In step S208, the communication apparatus 100 uses the Response method of the ATT protocol to send a handover response to the external apparatus 200A, and the external apparatus 200A receives that handover response from the communication apparatus 100. The handover response contains connection information for connecting to the generated wireless LAN network. The connection information contains connection parameter information such as a service set identifier (SSID) and an encryption key. Thus, the external apparatus 200A can acquire information for connecting to the wireless LAN network from the communication apparatus 100.

In step S209, the external apparatus 200A generates a wireless LAN connection request packet on the basis of the connection parameter information received in step S208, and sends that request packet to the communication apparatus 100. The communication apparatus 100 receives the wireless LAN connection request packet from the external apparatus 200A. In step S210, the communication apparatus 100 sends a wireless LAN connection response packet to the external apparatus 200A. The external apparatus 200A receives the wireless LAN connection response packet from the communication apparatus 100. The wireless LAN connection response packet indicates that the connection request of step S209 has been successful. After step S210, the communication apparatus 100 and the external apparatus 200A can communicate with each other by wireless LAN communication technology.

In the next step S211, the communication apparatus 100 sends a BLE communication termination packet to the external apparatus 200A to terminate the BLE communication connection with the external apparatus 200A, and resumes sending an advertise packet. As used herein, the BLE communication termination packet refers to the LL_TERMINATE_IND of the LL Control PDU that is defined in the BLE standard. In step S211, the communication apparatus 100 causes the operation mode of BLE communication to transition from the connection mode to the advertise mode. The external apparatus 200A, upon receiving the BLE communication termination packet (LL_TERMINATE_IND) from the communication apparatus 100, causes the operation mode of BLE communication from the connection mode to a standby mode. As used herein, the standby mode refers to a state which is equivalent to the Standby State that is defined in the BLE communication standard, and in which BLE communication is paused. As a result, after a wireless LAN communication has been established between the external apparatus 200A and the communication apparatus 100, the external apparatus 200A does not receive an advertise packet that the communication apparatus 100 resumes sending.

Next, a process of establishing a BLE communication connection between the communication apparatus 100 and the external apparatus 200B is started. In step S212, the external apparatus 200B activates a BLE function in a scanning mode. The detail is similar to that of step S201. In step S213, the communication apparatus 100 sends an advertise packet, and the external apparatus 200B, which is operating in the scanning mode, receives that advertise packet. The detail is similar to that of step S202. In step S214, the external apparatus 200B sends a BLE scan request packet to the communication apparatus 100, and the communication apparatus 100 receives that scan request packet. The detail is similar to that of step S203.

In step S215, the communication apparatus 100, which has received the scan request packet, sends a scan response packet to the external apparatus 200B in response to the scan request packet. The external apparatus 200B receives the scan response packet sent by the communication apparatus 100. The detail is similar to that of step S204. In step S216, the external apparatus 200B sends a BLE connection request packet to the communication apparatus 100, and the communication apparatus 100 receives that BLE connection request packet from the external apparatus 200B. The detail is similar to that of step S205. In step S217, the external apparatus 200B sends a handover request to the communication apparatus 100, and the communication apparatus 100 receives that handover request from the external apparatus 200B. The detail is similar to that of step S206.

At this time, the communication apparatus 100 has activated the wireless LAN communication unit 107 in step S207, and is already operating as an AP. Therefore, in step S218 following step S217, the communication apparatus 100 sends a handover response to the external apparatus 200B. The detail is similar to that of step S208. In step S219, the external apparatus 200B sends a wireless LAN connection request packet to the communication apparatus 100, and the communication apparatus 100 receives that wireless LAN connection request packet from the external apparatus 200B. The detail is similar to that of step S209. In step S220, the communication apparatus 100 sends a wireless LAN connection response packet to the external apparatus 200B. The external apparatus 200B receives that wireless LAN connection response packet from the communication apparatus 100. The detail is similar to that of step S210. After step S220, the communication apparatus 100 and the external apparatus 200B can communicate with each other by wireless LAN communication technology.

In step S221, the communication apparatus 100 sends a BLE communication termination packet to the external apparatus 200B, and resumes sending an advertise packet. The external apparatus 2009, upon receiving the BLE communication termination packet (LL_TERMINATE_IND) from the communication apparatus 100, causes the operation mode of BLE communication to transition from the connection mode to the standby mode. The detail is similar to that of step S211.

A handover process sequence in the system according to this embodiment has been described above with reference to FIGS. 2A and 2B. Note that the sequence of FIGS. 2A and 2B illustrates the flow of the process executed in each apparatus included in the system according to this embodiment, and various changes can be made thereto without departing the scope and spirit of the invention.

Figure 2B:
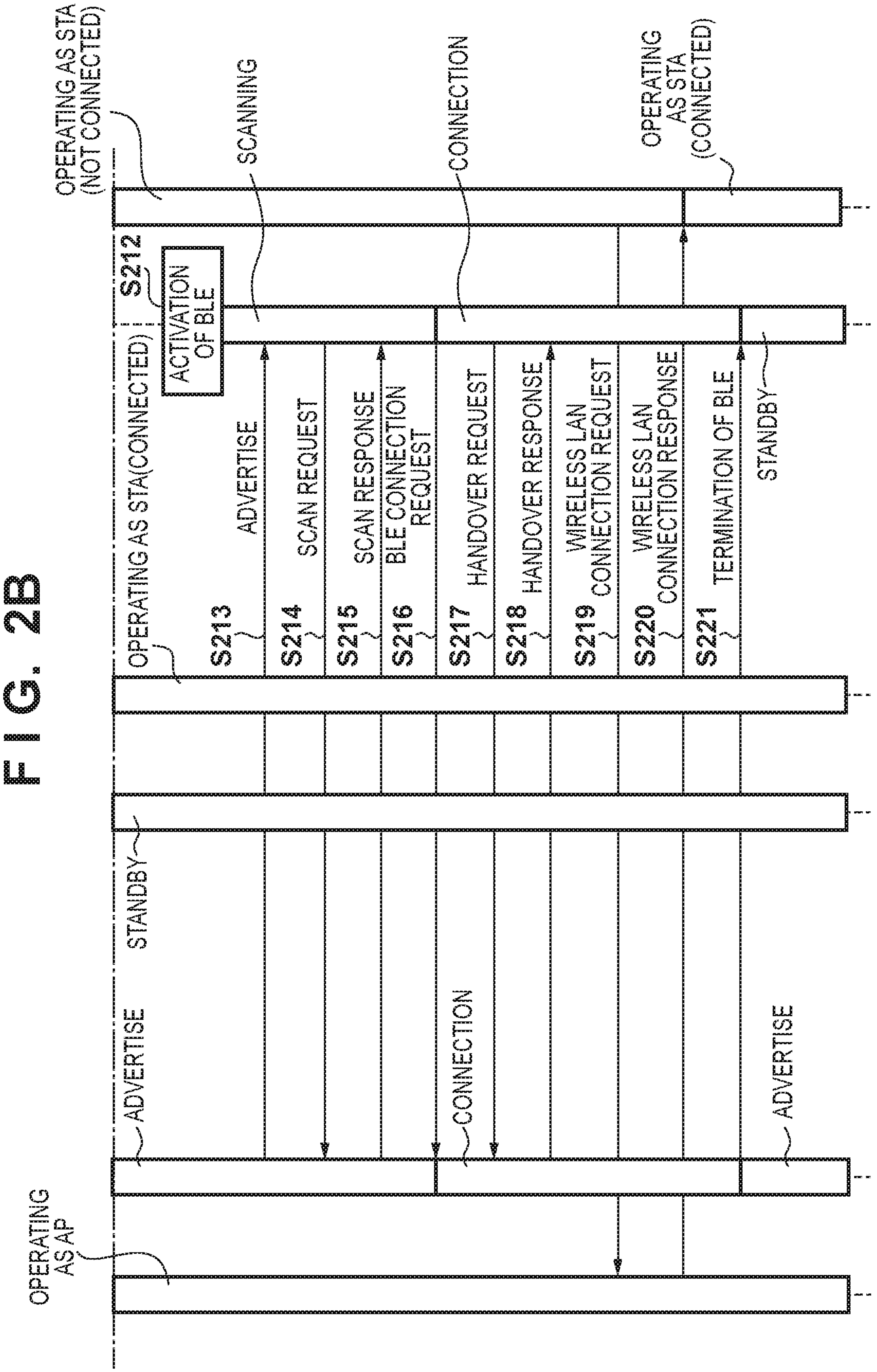

For example, in FIG. 2B, the activation of the BLE communication function of the external apparatus 200B in step S212 is performed after the BLE termination in step S211. Alternatively, the BLE communication function may be activated at a timing before the BLE termination of step S211. Note that even when the BLE communication function is activated before step S211, an advertise packet is not sent until the communication apparatus 100 starts operating in the advertise mode. Therefore, the external apparatus 2003 waits to receive an advertise packet from the communication apparatus 100 until step S211 in which the communication apparatus 100 performs BLE termination and resumes sending an advertise packet.

The advertise packet and scan response packet that are sent by the communication apparatus 100 when the communication apparatus 100 is operating in the advertise mode, may contain information related to a wireless LAN network generated by the communication apparatus 100. In the case where such information is contained in the advertise packet, that information can be stored in the AdvData area of the format 301 of FIG. 3. In the case where the information is contained in the scan response packet, the information can be stored in the ScanRspData area of the format 303 of FIG. 3. The stored information includes, for example, information indicating whether or not a connection to the wireless LAN network is allowed, information indicating the number of additional apparatuses that are allowed to be connected to the wireless LAN network, information indicating a frequency band (channel) in which the wireless LAN network is generated, or the like. The wireless LAN network may have, for example, a 5-GHz band or a 2.4-GHz band. The information may indicate which of the frequency bands has been used to generate the wireless LAN network. When these pieces of information are contained, the external apparatus (200A, 200B) can previously determine whether or not a connection to the wireless LAN network is allowed, and whether or not it is necessary to establish a BLE connection. Therefore, when the connection is not allowed, it is no longer necessary to send a BLE connection request, a handover request, a wireless LAN connection request, or the like, i.e., needless communication is not performed, and therefore, communication traffic can be reduced.

<Handover Process Flowchart>

A process of the communication apparatus 100 in this embodiment will be described with reference to a flowchart shown in FIG. 4. The process corresponding to the flowchart can be carried out by one or more processors that function as the control unit 101 of the communication apparatus 100 executing a corresponding program (stored in the non-volatile memory 102, or the like). In this process, when the communication apparatus 100 is in its initial state, the BLE communication function is operating in the standby mode, and the wireless LAN communication function is not operating. Each step of the process will now be described.

Initially, in step S401, the control unit 101 controls the BLE communication unit 106 to start sending an advertise packet. The advertise packet may contain information related to a wireless LAN network. As a result, the operation mode of BLE communication transitions from the standby mode to the advertise mode. Step S401 corresponds to the operation of the communication apparatus 100 that has been described above in connection with steps S202 of FIG. 2A and S213 of FIG. 2B. In step S402, the control unit 101 monitors whether or not a scan request packet has been received from an external apparatus 200, through the BLE communication unit 106. If the control unit 101 determines that a scan request packet has been received, the process proceeds to step S403. Step S402 corresponds to the operation of the communication apparatus 100 that has been described above in connection with steps S203 of FIG. 2A and S214 of FIG. 2B. If, in step S402, the control unit 101 determines that a scan request packet has not been received, the process returns to step S401. In the next step S403, the control unit 101 controls the BLE communication unit 106 to send a scan response packet to the external apparatus 200. The scan response packet can contain information related to a wireless LAN network. Step S403 corresponds to the operation of the communication apparatus 100 that has been described above in connection with steps S204 of FIG. 2A and S215 of FIG. 2B.

In the next step S404, the control unit 101 monitors whether or not a BLE connection request packet has been received from the external apparatus 200, through the BLE communication unit 106. If the control unit 101 determines that a BLE connection request packet has been received, the process proceeds to step S405. If, in step S404, the control unit 101 determines that a BLE connection request packet has not been received, the process returns to step S401. In step S405, the control unit 101 controls the BLE communication unit 106 to establish a BLE communication connection e external apparatus 200. Steps S404 and S405 correspond to the operation of the communication apparatus 100 that has been described above in connection with steps S205 of FIG. 2A and S216 of FIG. 2B.

In the next step S406, the control unit 101 receives a handover request from the external apparatus 200 through the BLE communication unit 106. Step S406 corresponds to the operation of the communication apparatus 100 that has been described above in connection with steps S206 of FIG. 2A and S217 of FIG. 2B. In the next step S407, the control unit 101 determines whether or not the wireless LAN communication unit 107 is operating as an AP, and therefore, a wireless LAN network has already been generated. If the control unit 101 determines that a wireless LAN network has not been generated, the process proceeds to step S408. In step S408, the control unit 101 activates the wireless LAN communication unit 107 to cause the communication apparatus 100 to start operating as an AP, and generates a wireless LAN network. Steps S407 and S408 correspond to the operation of the communication apparatus 100 that has been described above in connection with step S207 of FIG. 2A. If, in step S407, the control unit 101 determines that a wireless LAN network has already been generated, the process proceeds to step S409.

In step S409, the control unit 101 controls the BLE communication unit 106 to send, to the external apparatus 200, connection information for connecting to the wireless LAN network generated by the wireless LAN communication unit 107. Step S409 corresponds to the operation of the communication apparatus 100 that has been described above in connection with steps S208 of FIG. 2A and S218 of FIG. 2B. In the next step S410, the control unit 101 receives a wireless LAN connection request packet from the external apparatus 200, through the wireless LAN communication unit 107, and thereby establishes a wireless LAN communication connection with the external apparatus 200. Step S410 corresponds to the operation of the communication apparatus 100 that has been described above in connection with steps S209 and S210 of FIG. 2A, and S219 and S220 of FIG. 2B. In the next step S411, the control unit 101 controls the BLE communication unit 106 to terminate the BLE communication connection with the external apparatus 200 that has been established in step S405. Step S411 corresponds to the operation of the communication apparatus 100 that has been described above in connection with steps S211 of FIG. 2A and S221 of FIG. 2B. In step S412, the control unit 101 determines whether or not the number of STAs connected to the wireless LAN network generated by the wireless LAN communication unit 107 has reached a predetermined upper limit value. If the control unit 101 determines that the predetermined upper limit value has not been reached, the process proceeds to step S513. If the control unit 101 determines that the predetermined upper limit value has been reached, the process is ended. In step S413, the control unit 101 determines whether or not an operation of requesting ending of the handover function has been detected through the operation unit 105. If the control unit 101 determines that the ending operation has been detected, the process is ended. If the control unit 101 determines that the ending operation has not been detected, the process returns to step S401.

Operations of the communication apparatus 100 in this embodiment have been described above with reference to FIG. 4. Note that this flowchart illustrates a flow of a process according to an example embodiment, and various changes can be made thereto without departing the scope and spirit of the invention. For example, although, in steps S411 and S412, the number of STAs connected to a wireless LAN network is determined after BLE communication with the external apparatus 200 has been terminated, the invention is not limited to this. For example, initially, the control unit 101 may determine the number of STAs connected to a wireless LAN network, and if the control unit 101 determines that the predetermined upper limit value has not been reached, BLE communication with the external apparatus 200 may be terminated in order to establish a BLE communication connection with another external apparatus, and the process may proceed to step S413. Meanwhile, if the control unit 101 determines that the number of STAs has reached the predetermined upper limit value, it is no longer necessary to establish a BLE communication connection with another external apparatus, and therefore, the flow may be ended without BLE communication with the external apparatus 200 being terminated, i.e., with the connection mode being maintained. In this case, a BLE communication connection with an external apparatus 200 on which a handover process has most recently been performed is maintained.

Alternatively, after a BLE communication connection with an external apparatus 200 has been established in step S405, the control unit 101 may further determine whether or not a wireless LAN communication connection with the external apparatus 200 has been established. If the control unit 101 determines that the wireless LAN connection has been established, the BLE communication unit 106 may be controlled not to execute the subsequent handover process. Specifically, the process may proceed to step S411, in which the BLE communication unit 106 is controlled to terminate the BLE communication. The determination of whether or not a wireless LAN communication connection has been established can, for example, be carried out as follows. Initially, the control unit 101 stores the BD address of an external apparatus 200 contained in a BLE connection request packet, as a record of an execution history, into the volatile memory 103, or the like, each time a handover process is executed. The control unit 101, upon receiving a BLE connection request packet from an external apparatus 200, determines whether or not the BD address of the external apparatus 200 is the same as one of the BD addresses for which a handover process has already been executed. Here, if the control unit 101 determines that the BD address of the external apparatus 200 is the same as one that is stored in the execution history, a wireless LAN communication connection has already been established, and therefore, the control unit 101 controls the BLE communication unit 106 to terminate BLE communication.

Figure 5:
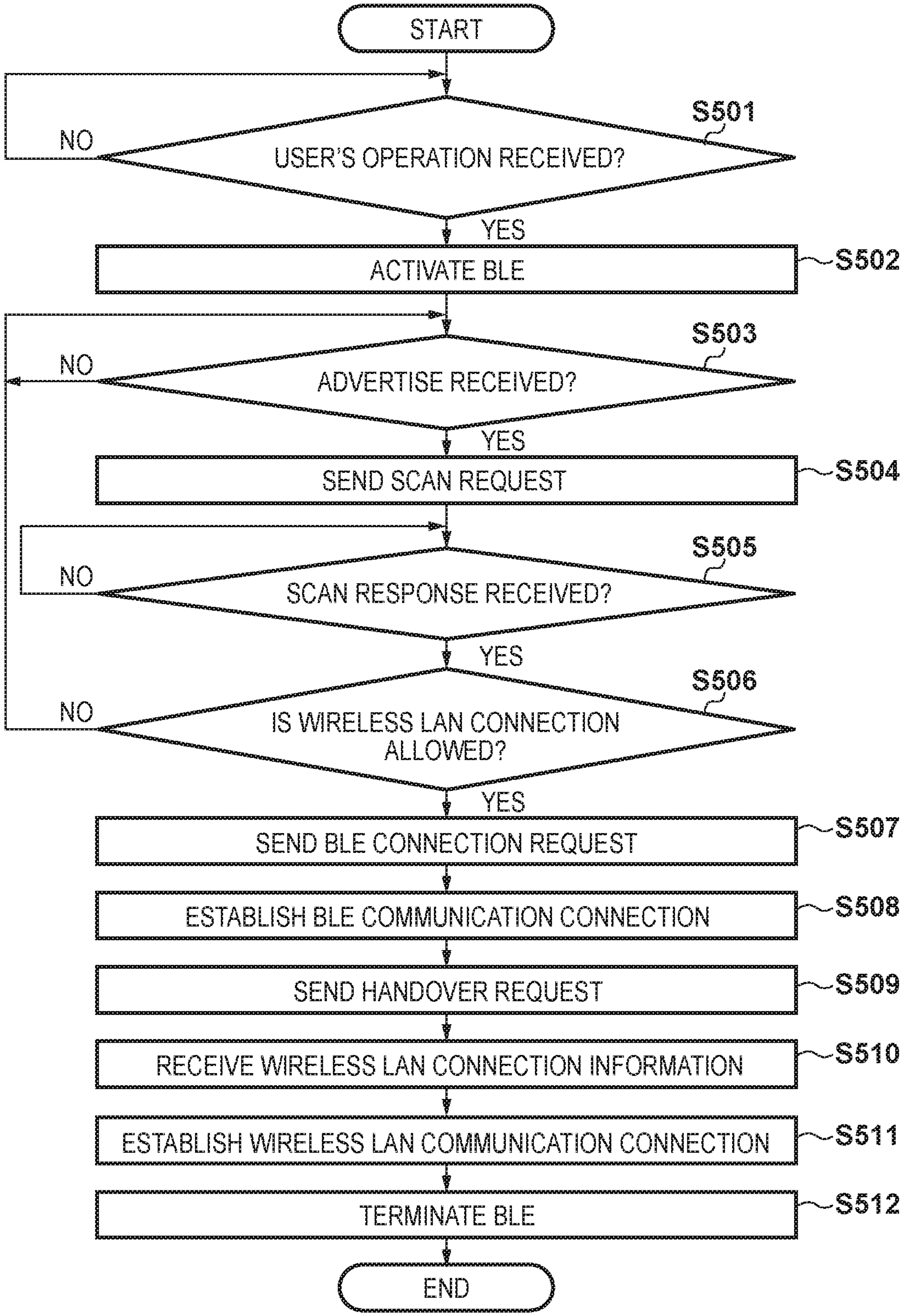
FIG. 5 is a flowchart showing an example of a process in an external apparatus according to the first embodiment of the invention.

Next, a process of the external apparatus 200 in this embodiment will be described with reference to a flowchart shown in FIG. 5. A process corresponding to the flowchart can be carried out by one or more processors that function as the control unit 201 of the external apparatus 200 executing a corresponding program (stored in the non-volatile memory 202, or the like). In this process, when the external apparatus 200 is in its initial state, the BLE communication function is paused, the wireless LAN communication function is operating as an STA, and the external apparatus 200 is not connected to a wireless LAN network. Each step will not be described.

Initially, in step S501, the control unit 201 determines whether or not a user's operation to activate a particular application through the operation unit 205 has been received. If the control unit 201 determines that such an operation has been received, the process proceeds to step S502. In step S502, the control unit 201 controls the BLE communication unit 206 to activate the BLE function in the scanning mode. Steps S501 and S502 correspond to the operation of the external apparatus 200 that has been described above in connection with steps S201 of FIG. 2A and S212 of FIG. 23. After the BLE function has been activated in the scanning mode, in the next step S503 the control unit 201 monitors whether or not an advertise packet has been received from the communication apparatus 100, through the BLE communication unit 206. If the control unit 201 determines that an advertise packet has been received, the process proceeds to step S504. Step S503 corresponds to the operation of the external apparatus 200 that has been described above in connection with steps S202 of FIG. 2A and S213 of FIG. 2B. In the next step S504, the control unit 201 controls the BLE communication unit 206 to send a scan request packet to the communication apparatus 100. Step S504 corresponds to the operation of the external apparatus 200 that has been described above in connection with steps S203 of FIG. 2A and S214 of FIG. 2B.

In the next step S505, the control unit 201 monitors whether or not a scan response packet has been received from the communication apparatus 100, through the BLE communication unit 206. If the control unit 201 determines that a scan response packet has been received, the process proceeds to step S506. Step S505 corresponds to the operation of the external apparatus 200 that has been described above in connection with steps S204 of FIG. 2A and S215 of FIG. 2B.

In the next step S506, the control unit 201 determines whether or not a wireless LAN connection with the communication apparatus 100 is allowed. In this embodiment, information related to the above wireless LAN network can be incorporated into the advertise packet received in step S503 or the scan response packet received in step S505. The control unit 201, upon receiving the information, may store the information into the volatile memory 203, so that the control unit 201 can retrieve the information when the determination of step S506 is performed. For example, if a received packet contains information indicating whether or not a connection to a wireless LAN network is allowed, and the information indicates that the connection is allowed, the control unit 201 can determine that a wireless LAN connection is allowed. Alternatively, if a received packet contains information indicating the number of additional apparatuses that are allowed to be connected to a wireless LAN network, and the information indicates that the number of such additional apparatuses is one or more, the control unit 201 can determine that a wireless LAN connection is allowed. Alternatively, if a received packet contains information indicating a frequency band for a wireless LAN network connection, and the frequency band allows connection of an external apparatus 200, the control unit 201 can determine that a wireless LAN connection is allowed. If the control unit 201 determines that a wireless LAN connection is allowed, the process proceeds to step S507.

Meanwhile, if the control unit 201 determines that a wireless LAN network connection is not allowed, the process returns to step S503. If the determination of step S506 indicates that a wireless LAN network connection is not allowed, none of a BLE connection request, a handover request, and a wireless LAN connection request is required, and all of them can be omitted. Therefore, the scanning mode can be continued without transition to the connection mode.

In the next step S507, the control unit 201 controls the BLE communication unit 206 to send a BLE connection request packet to the communication apparatus 100. In the next step S508, the control unit 201 controls the BLE communication unit 206 to establish a BLE communication connection with the communication apparatus 100. Steps S507 and S508 correspond to the operation of the external apparatus 200 that has been described above in connection with steps S205 of FIG. 2A and S216 of FIG. 2B. In the next step S509, the control unit 201 sends a handover request to the communication apparatus 100 through the BLE communication unit 206. Step S509 corresponds to the operation of the external apparatus 200 that has been described above in connection with steps S206 of FIG. 2A and S217 of FIG. 2B. In the next step S510, the control unit 201 receives connection information as a handover response from the communication apparatus 100 through the BLE communication unit 206. The handover response contains connection information such as connection parameter information for connecting to the wireless LAN network that has been generated by the wireless LAN communication unit 207 of the communication apparatus 100. Step S510 corresponds to the operation of the external apparatus 200 that has been described above in connection with steps S208 of FIG. 2A and S218 of FIG. 2B.

In the next step S511, the control unit 201 sends a wireless LAN connection request packet to the communication apparatus 100 through the wireless LAN communication unit

207, and thereby establishes a wireless LAN communication connection with the communication apparatus 100. Step S511 corresponds to the operation of the external apparatus 200 that has been described above in connection with steps S209 and S210 of FIG. 2A, and S219 and S220 of FIG. 2B. In the next step S512, the control unit 201 controls the BLE communication unit 206 to terminate the BLE communication connection with the communication apparatus 100 that has been established in step S507. Step S512 corresponds to the operation of the external apparatus 200 that has been described above in connection with steps S211 of FIG. 2A and S221 of FIG. 2B.

Although, in the above embodiment, the determination of step S506 is performed after a scan response has been received in step S505, the determination of step S506 may be performed after step S503 if the advertise packet contains information related to a wireless LAN network. In this case, the control unit 101 continually monitors an advertise packet sent by the communication apparatus 100, and if the control unit 101 determines, on the basis of information related to a wireless LAN network contained in the advertise packet, that a connection to the wireless LAN network is allowed, step S504 and following steps are executed.

According to the above embodiment, the handover mechanism (BLE handover) can be used to establish a wireless LAN communication connection between a communication apparatus operating as a peripheral and a plurality of external apparatuses operating as a central.

Second Embodiment

In the first embodiment, it is assumed that wireless LAN communication is directly performed between the communication apparatus 100 and the external apparatuses 200 with the wireless LAN communication unit 107 of the communication apparatus 100 being operating as an AP. In a second embodiment, it is assumed that wireless LAN communication is performed between a communication apparatus 100 and external apparatuses 200, through a wireless LAN router 600, with a wireless LAN communication unit 107 of the communication apparatus 100 being operating as an STA. Note that only features specific to this embodiment will be described in detail, and features similar to those of the first embodiment will not be described.

<Internal Configuration of Communication Apparatus>

The internal configuration of the communication apparatus is similar to that of the first embodiment and will not be described.

<System Configuration>

Figure 6:
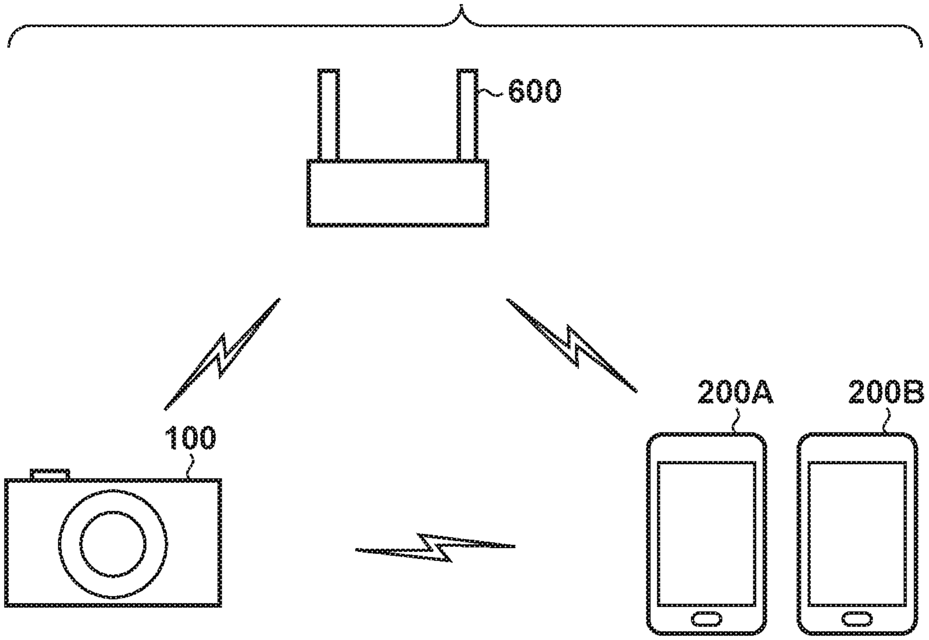
FIG. 6 is a diagram showing an example of a system configuration according to a second embodiment of the invention.

FIG. 6 is a diagram showing a system configuration in this embodiment. The communication apparatus 100 and the external apparatuses (200A and 200B) are similar to those of the first embodiment. The wireless LAN router 600 is a relay device for relaying wireless LAN communication between the communication apparatus 100 and the external apparatuses 200. The communication apparatus 100 and the external apparatuses (200A and 200B) can communicate with each other by BLE communication technology. The communication apparatus 100 can operate as a BLE peripheral, and the external apparatuses (200A and 200B) can each operate as a central. Therefore, the communication apparatus 100 cannot simultaneously establish a BLE communication connection with both of the external apparatuses 200A and 200B.

The communication apparatus 100 and the external apparatuses (200A and 200B) can communicate with each other through the wireless LAN router 600 by wireless LAN communication technology. The wireless LAN router 600 operates as a wireless LAN AP to generate a wireless LAN network. The communication apparatus 100 and the external apparatuses (200A and 200B) operate as a wireless LAN station (hereinafter referred to as an "STA") to connect to the wireless LAN network generated by the wireless LAN router 600, and thereby communicate with each other by wireless LAN communication technology.

<Handover Process Sequence>

Figure 7A:
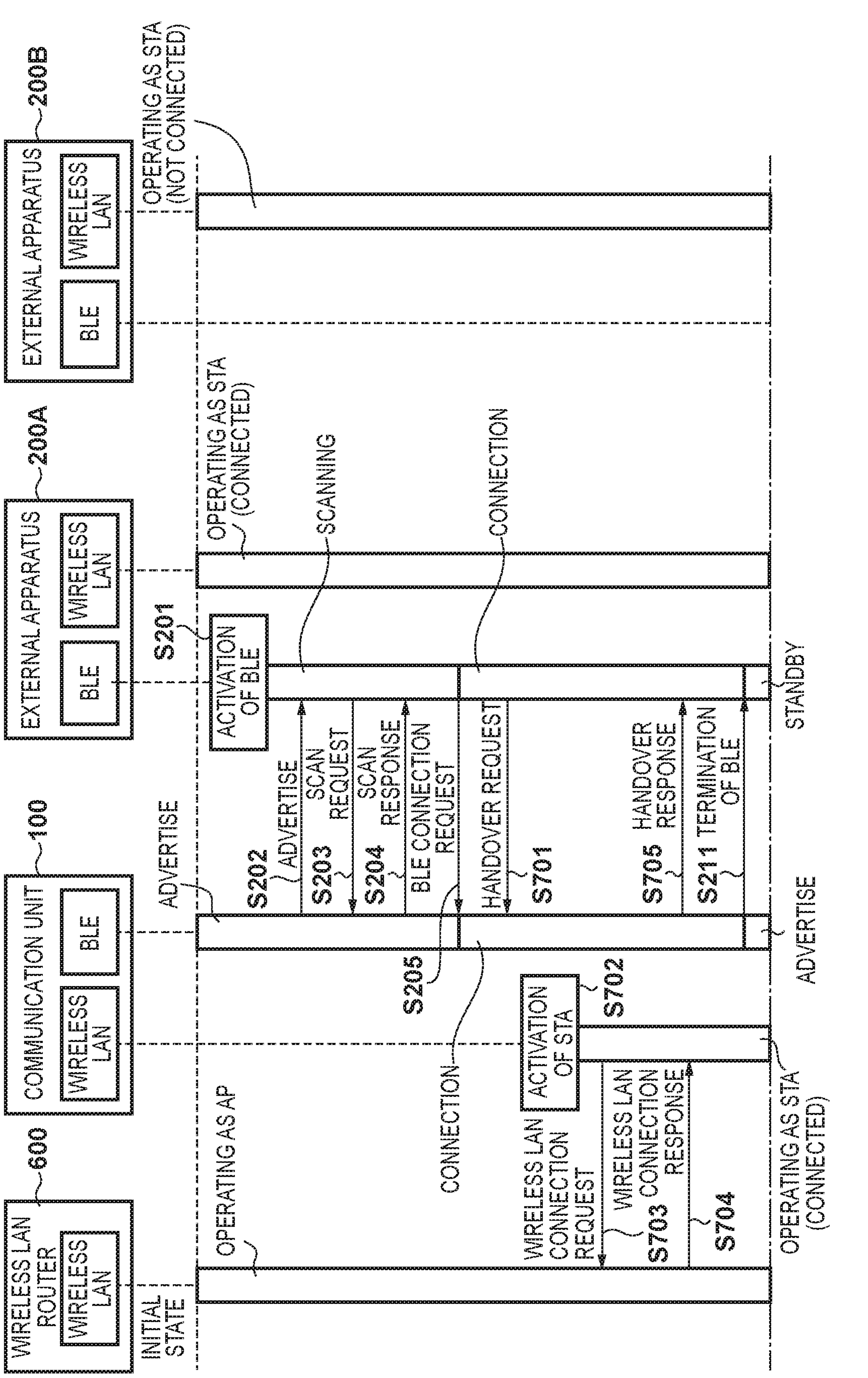
FIG. 7A and FIG. 7B are diagrams showing an example of a sequence of a program executed by a system according to the second embodiment of the invention.
Figure 7B:
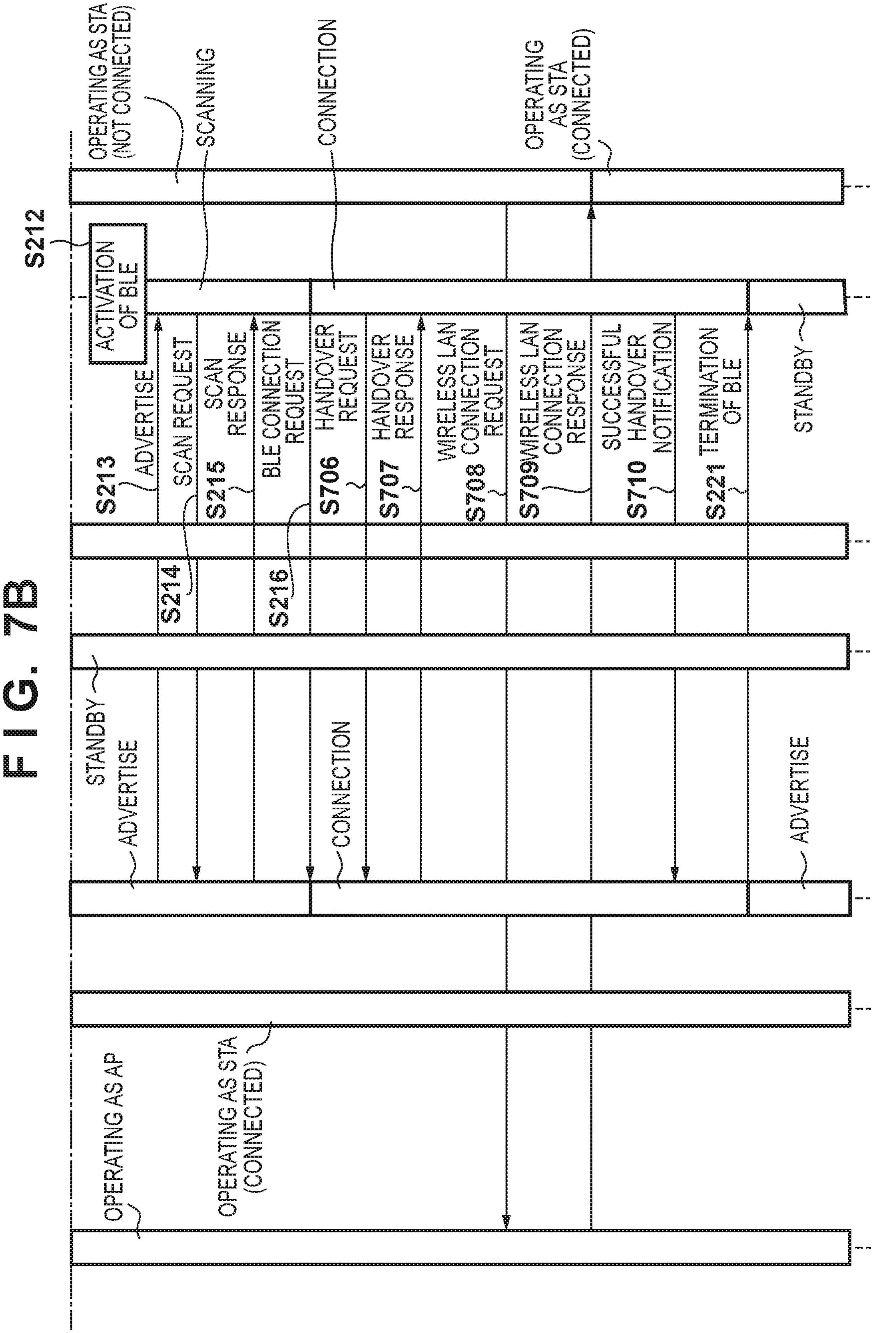

A handover process sequence of the communication apparatus 100 in this embodiment will be described with reference to FIGS. 7A and 7B. This sequence is an example sequence in which the communication apparatus 100 executes a handover process on the two external apparatuses (200A and 200B) to establish a wireless LAN communication connection through the wireless LAN router 600.

In the sequence, when the communication apparatus 100 is in its initial state, the BLE communication function is operating in an advertise mode, and the wireless LAN communication function is paused. The advertise mode and the pause state of the wireless LAN communication function each have a meaning similar to that which has been described in the first embodiment.

In the sequence, when the external apparatus 2004 is in its initial state, the BLE communication function is paused, the wireless LAN communication function is operating as an STA, and the external apparatus 200A is connected to a wireless LAN network generated by the wireless LAN router 600. Meanwhile, when the external apparatus 200B is in its initial state, the BLE communication function is paused, the wireless LAN communication function is operating as an STA, and the external apparatus 200B is not connected to the wireless LAN network. Thus, in this embodiment, the external apparatus 200A is connected to the wireless LAN network, while the external apparatus 200B is not connected to the wireless LAN network. Therefore, the second embodiment is different from the first embodiment in their initial states.

In the sequence, when the wireless LAN router 600 is in its initial state, the wireless LAN communication function is operating as an AP, and a wireless LAN network is generated.

Each step of the sequence will now be described. Note that steps similar to those of FIGS. 2A and 2B are indicated by the same reference characters and will not be described. Initially, steps of establishing a BLE communication connection between the communication apparatus 100 and the external apparatus 200A are similar to steps S201 to S205 of FIG. 2A. If a BLE communication connection has been established, in step S701 the external apparatus 200A sends a handover request to the communication apparatus 100 using the Request method of the ATT protocol. The handover request contains information indicating the presence or absence of a wireless LAN network specified as a connection destination, and if that information indicates the presence, contains connection information such as connection parameter information for connecting to the wireless LAN network. In this embodiment, the external apparatus 200A has already been connected to the wireless LAN network generated by the wireless LAN router 600, and therefore, information specifying the wireless LAN network, and connection parameter information, are sent to the communication apparatus 100.

In the next step S702, the communication apparatus 100 activates the wireless LAN communication unit 107 as an STA. As a result, the above low power consumption state of the communication apparatus 100 is ended. In step S703, the communication apparatus 100 generates a wireless LAN connection request packet on the basis of the connection parameter information received in step S701, and sends the wireless LAN connection request packet to the wireless LAN router 600. In step S704, the wireless LAN router 600 sends a wireless LAN connection response packet to the communication apparatus 100. This indicates that the connection request of step S703 has been successful. After step S704, the communication apparatus 100 and the external apparatus 200A can communicate with each other by wireless LAN communication technology. In step S705, the communication apparatus 100 sends a handover response to the external apparatus 200A using the Response method of the ATT protocol. This indicates that the handover request of step S701 has been successful. Thereafter, as in the first embodiment, in step S211 the communication apparatus 100 sends a BLE communication termination packet to the external apparatus 200A, and resumes sending an advertise packet.

Next, a process of establishing a BLE communication connection between the communication apparatus 100 and the external apparatus 200B is started. Steps of establishing a BLE communication connection between the communication apparatus 100 and the external apparatus 200B are similar to steps S213 to S216 of FIG. 2B. If a BLE communication connection has been established, in step S706 the external apparatus 200B sends a handover request to the communication apparatus 100 using the Request method of the AFT protocol. The handover request contains information indicating the presence or absence of a wireless LAN network specified as a connection destination, and if that information indicates the presence, connection information such as connection parameter information for connecting to the wireless LAN network. In this step, the external apparatus 200B has not been connected to the wireless LAN network, and therefore, the information indicating the absence is sent to the communication apparatus 100.

In step S707, the communication apparatus 100 sends a handover response to the external apparatus 2009 using the Response method of the ATT protocol. The handover response contains connection parameter information for connecting to the wireless LAN network to which the communication apparatus 100 has been connected. In this embodiment, the communication apparatus 100 has already been connected to the wireless LAN network generated by the wireless LAN router 600, and therefore, information specifying the wireless LAN network, and connection parameter information, are sent to the external apparatus 200B.

In step S708, the external apparatus 200B generates a wireless LAN connection request packet on the basis of the connection parameter information received in step S707, and sends the wireless LAN connection request packet to the wireless LAN router 600. In step S709, the wireless LAN router 600 sends a wireless LAN connection response packet to the external apparatus 200B. This indicates that the connection request of step S708 has been successful. After step S709, the communication apparatus 100 and the external apparatus 200B can communicate with each other by wireless LAN communication technology. In step S710, the external apparatus 200B sends, to the communication apparatus 100, information indicating that a wireless LAN communication connection has been successfully established by handover, using the Notification method of the ATT protocol. A handover process sequence of the communication apparatus 100 in this embodiment has been described above with reference to FIGS. 7A and 7B.

<Handover Process Flowchart>

Figure 8:
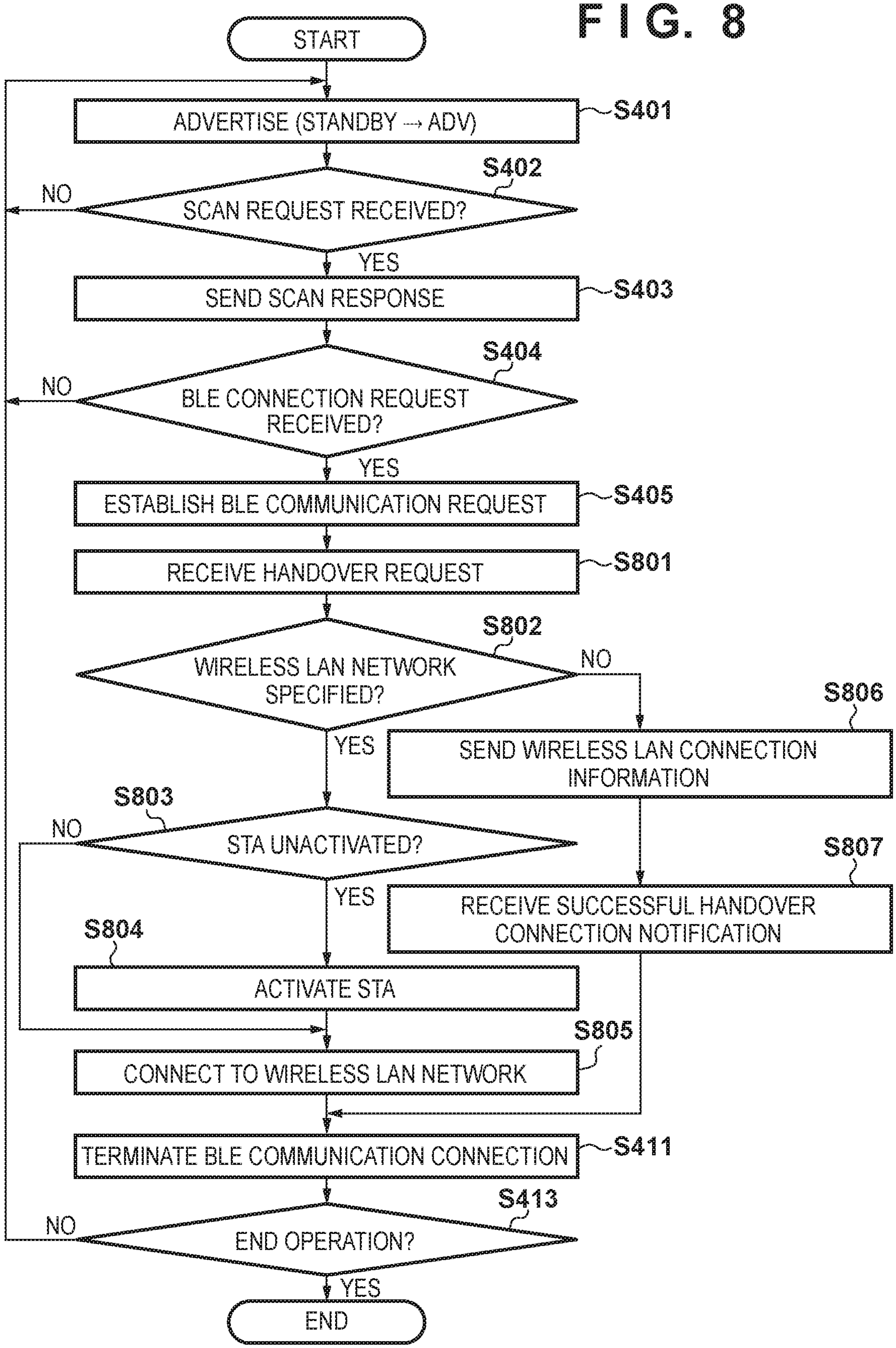
FIG. 8 is a flowchart showing an example of a process in a communication apparatus according to the second embodiment of the invention.

An operation of the communication apparatus 100 in this embodiment will be described with reference to a flowchart shown in FIG. 8. A process corresponding to the flowchart can be carried out by one or more processors that function as the control unit 101 of the communication apparatus 100 executing a corresponding program (stored in the non-volatile memory 102, or the like). In this process, when the communication apparatus 100 is in its initial state, the BLE communication function is operating in the standby mode, and the wireless LAN communication function is paused. Each step will now be described. Note that steps similar to those of FIG. 4 are indicated by the same reference characters and will not be described.

Figure 4:
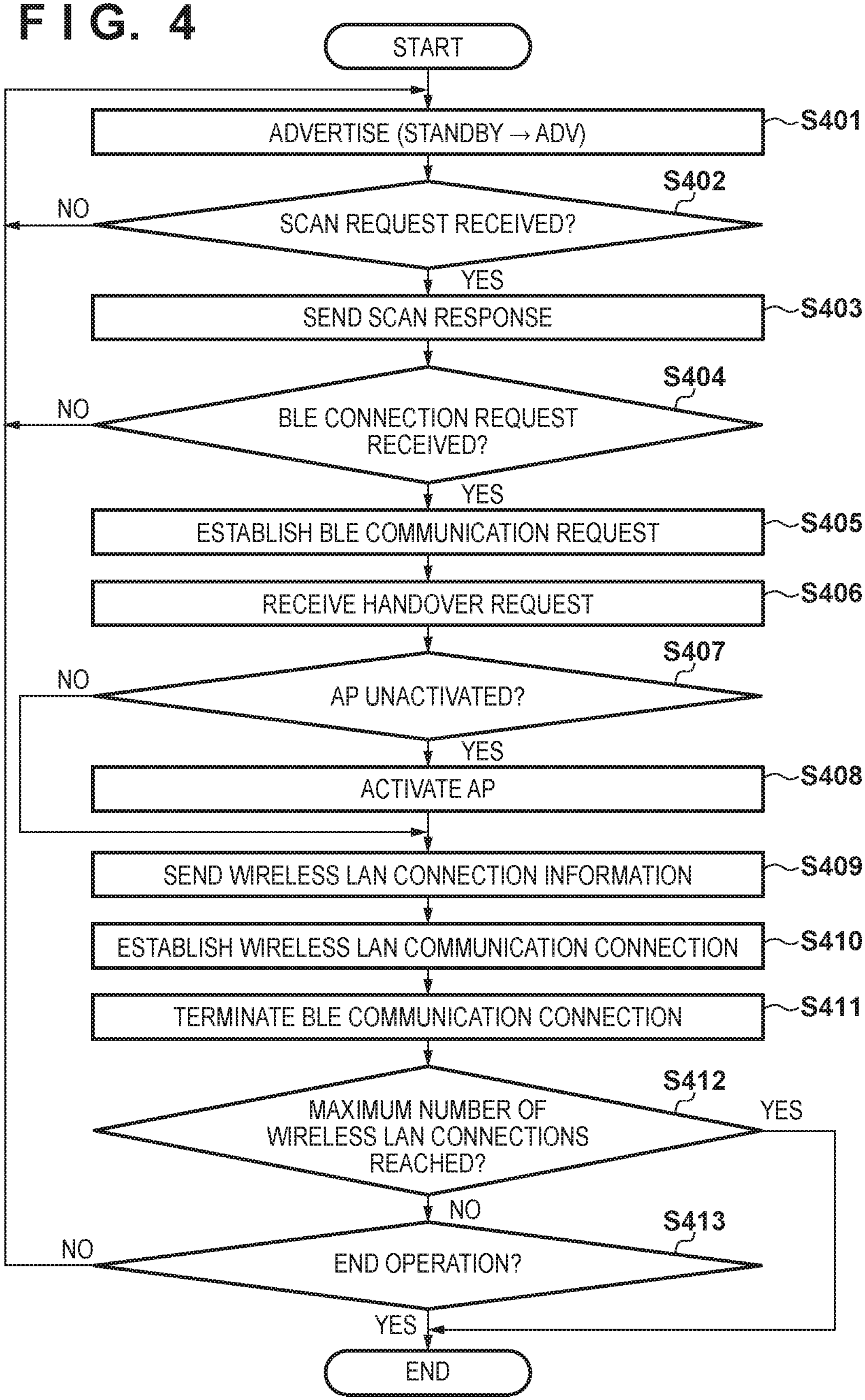
FIG. 4 is a flowchart showing an example of a process in a communication apparatus according to the first embodiment of the invention.

The step of transitioning to the advertise mode to the step of establishing a BLE communication connection with an external apparatus 200 are similar to steps S401 to S405 of FIG. 4. Next, in step S801, the control unit 101 receives a handover request from the external apparatus 200 through the BLE communication unit 106. Step S801 corresponds to the operation of the communication apparatus 100 that has been described above in connection with steps S701 of FIG. 7A and S706 of FIG. 7B. The handover request contains information indicating the presence or absence of a wireless LAN network specified as a connection destination, and if that information indicates the presence, connection parameter information for connecting to the wireless LAN network. In step S802, the control unit 101 analyzes the contents of the handover request to determine whether or not a wireless LAN network specified as a connection destination is present. If the control unit 101 determines that such a wireless LAN network is present, the process proceeds to step S803. Otherwise, the process proceeds to step S806.

In step S803, the control unit 101 determines whether or not the wireless LAN communication unit 107 has been activated as an STA. If the control unit 101 determines that the wireless LAN communication unit 107 has not been activated as an STA, the process proceeds to step S804. Otherwise, the process proceeds to step S805. In step S804, the control unit 101 activates the wireless LAN communication unit 107 as an STA. As a result, the above low power consumption state of the communication apparatus 100 is ended. Step S804 corresponds to the operation of the communication apparatus 100 that has been described above in connection with step S702 of FIG. 7A. In step S805, the control unit 101 controls the wireless LAN communication unit 107 on the basis of the connection parameter information received in step S801 to connect to the wireless LAN network. Step S804 corresponds to the operation of the communication apparatus 100 that has been described above in connection with steps S703 and S704 of FIG. 7A.

Meanwhile, in step S806, the control unit 101 controls the BLE communication unit 106 to send, to the external apparatus 200, connection information for connecting to the wireless LAN network to which the communication apparatus 100 is connected. Step S806 corresponds to the operation of the communication apparatus 100 that has been described above in connection with step S707 of FIG. 7B. In the next step S807, the control unit 101 receives information indicating that a wireless LAN communication connection has been successfully established by handover, from the external apparatus 200 through the BLE communication unit 106. Step S807 corresponds to the operation of the communication apparatus 100 that has been described above in connection with step S710 of FIG. 7B.

A handover process of the communication apparatus 100 in this embodiment has been described above with reference to the flowchart of FIG. 8. Note that the flowchart illustrates a flow of a process according to an example embodiment, and various changes may be made thereto without departing the scope and spirit of the invention. For example, in step S806, if the communication apparatus 100 is not connected to a wireless LAN network, the wireless LAN communication unit 107 may be controlled to start operating as an AP, generate a wireless LAN network, and send connection parameter information for connecting to the generated wireless LAN network, to an external apparatus. This step is similar to step S408 of the first embodiment.

Although it is assumed above that, in step S807, BLE communication is used to detect when the external apparatus 200 has successfully established a wireless LAN communication connection, wireless LAN communication may be used. A detection protocol, such as the Simple Service Discovery Protocol (SSDP), may be used to determine whether or not an external apparatus is present on a wireless LAN network. Alternatively, if a wireless LAN network has been specified in step S802, and the communication apparatus 100 is already connected to a wireless LAN network different from that specified one, the wireless LAN network to which the communication apparatus 100 is currently connected may be terminated before the connection process of step S805 is executed.

Next, an operation of the external apparatuses 200 in this embodiment will be described. The operation of the external apparatuses 200 in this embodiment is similar to that which has been described above with reference to the flowchart of FIG. 5. Note that the external apparatuses 200A and 200B have different initial states, and therefore, the detailed process is partially different from that of the first embodiment.

Firstly, when the communication apparatus 100 is not operating as an AP of a wireless LAN network, the communication apparatus 100 does not send an advertise packet or a scan response packet that contains information related to the wireless LAN network. Therefore, in the process of FIG. 5, the determination process of step S506 is skipped, and the process proceeds to step S507.

The external apparatuses 200A and 200B have different steps S509 and S510. Firstly, in the external apparatus 200A, when a handover request is sent in step S509, information indicating the presence or absence of a wireless LAN network specified as a connection destination, and connection parameter information for connecting to that wireless LAN network if such a wireless LAN network is present, are incorporated into the handover request. In this embodiment, the external apparatus 200A has already been connected to a wireless LAN network generated by the wireless LAN router 600, and therefore, information specifying that wireless LAN network, and connection parameter information, are sent to the communication apparatus 100. Step S509 corresponds to the operation of the external apparatus 200A that has been described above in connection with step S701 of FIG. 7A. In addition, it is no longer necessary to receive connection parameter information and establish a wireless LAN communication connection. The control unit 201 can skip steps S510 and S511, and the process can proceed to step S512.

Meanwhile, in the external apparatus 200B, when a handover request is sent in step S509, connection parameter information is not incorporated into the handover request. In this embodiment, the external apparatus 200B is not connected to a wireless LAN network. Step S509 corresponds to the operation of the external apparatus 200B that has been described above in connection with step S706 of FIG. 7B. In the next step S510, the control unit 201 receives a handover response from the communication apparatus 100 through the BLE communication unit 206. The handover response contains connection information for connecting to the wireless LAN network to which the communication apparatus 100 has established a connection. Here, the communication apparatus 100 has already been connected to the wireless LAN network generated by the wireless LAN router 600, and therefore, information specifying the wireless LAN network, and connection information, are sent to the external apparatus 200B. Step S510 corresponds to the operation of the external apparatus 200B that has been described above in connection with step S707 of FIG. 7B.

Next, in step S511, the control unit 201 of the external apparatus 200B, upon receiving the information specifying the wireless LAN network, and the connection information, sends a wireless LAN connection request packet to the wireless LAN router 600 through the wireless LAN communication unit 207, and thereby establishes a wireless LAN communication connection to the wireless LAN router 600. In addition, the control unit 201 sends, to the communication apparatus 100, information indicating that a wireless LAN communication connection has been successfully established by BLE handover, through the BLE communication unit 206. Step S511 corresponds to the operation of the external apparatus 200B that has been described above in connection with steps S708 to S710 of FIG. 7B.

According to the embodiments described above with reference to the drawings, even when the wireless LAN communication unit 107 of the communication apparatus 100 is caused to operate as an STA, the handover mechanism can be used to establish a wireless LAN communication connection between an apparatus including a peripheral and a plurality of apparatuses including a central.

Other Examples

In the above embodiments, it is assumed that a wireless LAN communication connection is established before a BLE communication connection is terminated. In this regard, for example, a BLE communication connection is terminated at a timing when a response to a handover request is received. This is because if a handover request has been successfully accepted, it can be presumed that a wireless LAN connection is subsequently established. In that case, for example, step S211 of FIG. 2A is executed between step S208 and step S209. In addition, step S221 of FIG. 2B is executed between step S218 and step S219. As a result, the duration in which a BLE communication connection is established can be reduced, and the timings at which another external apparatus can scan BLE advertising from a communication apparatus, can be increased.

Embodiments of the invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (MID), or Blu-ray Disc (BD)™) a flash memory device, a memory card, and the like.

While the invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-131490, filed on Jul. 4, 2017, which is hereby incorporated by reference herein in its entirety.

What is claimed is:

1. A communication apparatus comprising:

a first communication unit;

a second communication unit; and at least one processor configured to perform operations of following units:

a control unit configured to control the first communication unit to perform first-type communication and the second communication unit to perform second-type communication different from the first-type communication, wherein the control unit establishes a connection through the first-type communication and a connection through second-type communication, to each of a plurality of external apparatuses, and communicates with each of the plurality of external apparatuses, controls the first communication unit to send a notification indicating a presence of the communication apparatus itself without identifying destinations, controls the first communication unit to establish a connection through the first-type communication to a first one of the plurality of external apparatuses that responds to the notification, controls the second communication unit to establish a connection through the second-type communication to the first external apparatus, on the basis of the first-type communication with the first external apparatus, if the connection through the second-type communication is established, controls the first communication unit to terminate the connection through the first-type communication to the first external apparatus and controls the first communication unit to resume sending the notification without identifying destinations, and if the connection through the second-type communication is not established, controls the first communication unit not to terminate the connection through the first-type communication to the first external apparatus and controls the first communication unit not to resume sending the notification without identifying destinations, wherein the first-type communication is supported by Bluetooth Low Energy (BLE) communication technology, and the second-type communication is supported by wireless Local Area Network (LAN) communication technology.

2. The communication apparatus according to claim 1, wherein the control unit controls the first communication unit to send predetermined information related to the second-type communication, wherein the predetermined information being used by the first external apparatus to determine whether or not to establish a connection through the second-type communication to the communication apparatus.

3. The communication apparatus according to claim 2, wherein the predetermined information includes information indicating whether or not establishing a connection through the second-type communication to the communication apparatus is allowed, or information indicating a number of additional apparatuses allowed to establish a connection through the second-type communication to the communication apparatus.

4. The communication apparatus according to claim 3, wherein the predetermined information further includes information indicating a frequency band used in the second-type communication.

5. The communication apparatus according to claim 1, wherein the control unit determines whether or not a number of the external apparatuses having an established connection through the second-type communication to the communication apparatus is a predetermined number, and upon determining that the number of the external apparatuses having an established connection through the second-type communication to the communication apparatus is the predetermined number, controls the first communication unit to maintain the connection through the first-type communication to the first external apparatus.

6. The communication apparatus according to claim 1, wherein in response to the establishment of a connection through the first-type communication to the first external apparatus, the control unit determines whether or not a connection through the second-type communication to the first external apparatus is already established, and upon determining that a connection through the second-type communication to the first external apparatus is already established, controls the first communication unit to terminate the connection through the first-type communication to the first external apparatus.

7. The communication apparatus according to claim 1, wherein the control unit controls the second communication unit to directly establish a connection through the second-type communication to the external apparatuses.

8. The communication apparatus according to claim 1, wherein the control unit controls the second communication unit to establish a connection through the second-type communication to the first external apparatus, through a relay device configured to provide the second-type communication.

9. The communication apparatus according to claim 8, wherein if a connection through the first-type communication to the first external apparatus is established, the first external apparatus has an established connection through the second-type communication to the relay device, and the communication apparatus does not yet have an established connection through the second-type communication to the relay device, the control unit controls the first communication unit to receive, from the first external apparatus, connection information for establishing a connection through the second-type communication to the relay device, and controls the second communication unit on the basis of the connection information to establish a connection through the second-type communication to the relay device.

10. The communication apparatus according to claim 8, wherein if a connection through the first-type communication to the first external apparatus is established, the first external apparatus does not yet have an established connection through the second-type communication to the relay device, and the communication apparatus has an established connection through the second-type communication to the relay device, the control unit controls the first communication unit to send, to the first external apparatus, connection information for establishing a connection through the second-type communication to the relay device.

11. An external apparatus comprising:

a first communication unit;

a second communication unit; and at least one processor configured to perform operations of following units:

a control unit configured to control the first communication unit to perform first-type communication and the second communication unit to perform second-type communication different from the first-type communication, wherein the control unit establishes a connection through the first-type communication and a connection through second-type communication, to a communication apparatus, and communicates with the communication apparatuses, controls the first communication unit to receive predetermined information sent by the communication apparatus and related to the second-type communication, determines, on the basis of the predetermined information, whether or not a connection through the second-type communication to the communication apparatus is allowed to be established, upon determining that a connection through the second-type communication to the communication apparatus is allowed to be established, controls the first communication unit to establish a connection through the first-type communication to the communication apparatus, controls the second communication unit to establish a connection through the second-type communication to the communication apparatus, on the basis of communication through the connection through the first-type communication, if the connection through the second-type communication is established, controls the first communication unit to terminate the connection through the first-type communication, and stop the first-type communication, and controls the first communication unit not to receive an advertise packet that the communication apparatus resumes sending, and if the connection through the second-type communication is not established, controls the first communication unit not to terminate the connection through the first-type communication and not to stop the first-type communication, wherein the first-type communication is supported by Bluetooth Low Energy (BLE) communication technology, and the second-type communication is supported by wireless Local Area Network (LAN) communication technology.

12. The external apparatus according to claim 11, wherein the predetermined information includes information indicating whether or not a connection through the second-type communication to the communication apparatus is allowed to be established, or information indicating a number of additional apparatuses allowed to establish a connection through the second-type communication to the communication apparatus, if the predetermined information indicates that a connection through the second-type communication is allowed to be established, or that the number of additional apparatuses allowed to establish a connection through the second-type communication to the communication apparatus is not zero, the control unit determines that a connection through the second-type communication to the communication apparatus is allowed to be established.

13. The external apparatus according to claim 12, wherein the predetermined information further includes information indicating a frequency band used in the second-type communication, and if the frequency band used is supported by the second communication unit, the control unit determines that a connection through the second-type communication to the communication apparatus is allowed to be established.

14. The external apparatus according to claim 11, wherein upon determining that a connection through the second-type communication to the communication apparatus is not allowed to be established, the control unit does not control the first communication unit to establish a connection through the first-type communication, and continues to receive predetermined information sent by the communication apparatus and related to the second-type communication.

15. A method for controlling a communication apparatus, wherein the communication apparatus includes a first communication unit configured to perform first-type communication, and a second communication unit configured to perform second-type communication different from the first-type communication, the method comprises:

causing the first communication unit to send a notification indicating a presence of the communication apparatus itself without identifying destinations;

causing the first communication unit to establish a connection through the first-type communication to a first one of the plurality of external apparatuses that responds to the notification;

causing the second communication unit to establish a connection through the second-type communication to the first external apparatus, on the basis of communication through the connection through the first-type communication;

if the connection through the second-type communication is established, causing the first communication unit to terminate the connection through the first-type communication to the first external apparatus and causing the first communication unit to resume sending the notification without identifying destinations; and if the connection through the second-type communication is not established, causing the first communication unit not to terminate the connection through the first-type communication to the first external apparatus and causing the first communication unit not to resume sending the notification without identifying destinations, wherein the first-type communication is supported by Bluetooth Low Energy (BLE) communication technology, and the second-type communication is supported by wireless Local Area Network (LAN) communication technology.

16. A method for controlling an external apparatus, wherein the external apparatus includes a first communication unit configured to perform first-type communication, and a second communication unit configured to perform second-type communication different from the first-type communication, and the method comprises:

causing the first communication unit to receive predetermined information sent by the communication apparatus and related to the second-type communication;

upon determining, on the basis of the predetermined information, that a connection through the second-type communication is allowed to be established, causing the first communication unit to establish a connection through the first-type communication to the communication apparatus;

causing the second communication unit to establish a connection through the second-type communication to the communication apparatus, on the basis of communication through the connection through the first-type communication;

if the connection through the second-type communication is established, causing the first communication unit to terminate the connection through the first-type communication to stop the first-type communication, and controls the first communication unit not to receive an advertise packet that the communication apparatus resumes sending, and if the connection through the second-type communication is not established, causing the first communication unit not to terminate the connection through the first-type communication and not to stop the first-type communication, wherein the first-type communication is supported by Bluetooth Low Energy (BLE) communication technology, and the second-type communication is supported by wireless Local Area Network (LAN) communication technology.

17. A non-transitory computer-readable storage medium storing a program that, when executed by a processor of a communication apparatus including a first communication unit configured to perform first-type communication, and a second communication unit configured to perform second-type communication different from the first-type communication, causes the processor to perform:

causing the first communication unit to send a notification indicating a presence of the communication apparatus itself without identifying destinations;

causing the first communication unit to establish a connection through the first-type communication to a first one of the plurality of external apparatuses that responds to the notification;

causing the second communication unit to establish a connection through the second-type communication to the first external apparatus, on the basis of communication through the connection through the first-type communication;

if the connection through the second-type communication is established, causing the first communication unit to terminate the connection through the first-type communication to the first external apparatus and causing the first communication unit to resume sending the notification without identifying destinations, and if the connection through the second-type communication is not established, causing the first communication unit not to terminate the connection through the first-type communication to the first external apparatus and causing the first communication unit not to resume sending the notification without identifying destinations, wherein the first-type communication is supported by Bluetooth Low Energy (BLE) communication technology, and the second-type communication is supported by wireless Local Area Network (LAN) communication technology.

18. A non-transitory computer-readable storage medium storing a program that, when executed by a processor of an external apparatus including a first communication unit configured to perform first-type communication, and a second communication unit configured to perform second-type communication different from the first-type communication, causes the processor to perform:

causing the first communication unit to receive predetermined information sent by the communication apparatus and related to the second-type communication;

upon determining, on the predetermined information, that a connection through the second-type communication is allowed to be established, causing the first communication unit to establish a connection through the first-type communication to the communication apparatus;

causing the second communication unit to establish a connection through the second-type communication to the communication apparatus, on the basis of communication through the connection through the first-type communication;

if the connection through the second-type communication is established, causing the first communication unit to terminate the connection through the first-type communication, and stop the first-type communication, and controls the first communication unit not to receive an advertise packet that the communication apparatus resumes sending, and if the connection through the second-type communication is not established, causing the first communication unit not to terminate the connection through the first-type communication and not to stop the first-type communication, wherein the first-type communication is supported by Bluetooth Low Energy (BLE) communication technology, and the second-type communication is supported by wireless Local Area Network (LAN) communication technology.

* * * * *